3,507,791
BIODEGRADABLE SOLUBLE LUBRICANTS
Ford C. Teeter, Palos Heights, Ill., and David B. Sheldahl, Griffith, Ind., assignors to Sinclair Research, Inc., New York, N.Y., a corporation of Delaware
No Drawing. Filed Feb. 1, 1967, Ser. No. 613,110
Int. Cl. C10m 1/32
U.S. Cl. 252—34.7          6 Claims

ABSTRACT OF THE DISCLOSURE

A lubricating composition which is essentially biodegradable and dispersible in water and made from about 1 to 77 weight percent of water; about 2 to 50 weight percent of a monocarboxylic acid (e.g., oleic acid); about 1 to 50 weight percent of a base which can be ammonia, an alkali metal hydroxide or an amine (e.g., ethanolamine); and about 20 to 90 weight percent of an alcohol (e.g., ethylene glycol). The composition contains at least about 3 weight percent of the salt of the acid and base. The composition may be prepared by combining at a temperature of about 65° to 140° F. the alcohol component with the acid salt which can be pre-formed or prepared in situ, and with any free acid or base, stirring the resulting combination to form a homogeneous mixture, and adding the water component.

---

This invention relates to novel water-containing fluid compositions that are biodegradable. More particularly, this invention pertains to novel water-containing lubricants and coolants which contain components that are essentially completely degraded by microorganisms common to waste-treatment systems.

Lubricants and coolants in industrial use today for a variety of operations, such as cutting, extruding, machining and forming metals, glass, etc., often called soluble or emulsifiable oils, generally contain a petroleum oil base compounded with emulsifiers and coupling agents to effect stable emulsions when mixed with large amounts of water. Anionic emulsifiers, such as sodium mahogony sulfonates are most often used due to the higher cost of the non-ionic type emulsifiers. Good emulsion stability has been effected in glass processing and metal working applications when anionic emulsifiers are employed in the soluble or emulsifiable oil compositions. In fact, the quality of good emulsion stability has created disposal problems of the used emulsions especially in industries where large volumes of the oils are employed. The problem is especially acute in the glass industry, for example, where soluble oil emulsions are used to lubricate shears and troughs of glass manufacturing equipment at highly dilute concentrations, and the emulsions are used in a single application only, and are not recirculated as is common in other industries. Glass plants customarily have disposed of their used emulsion effluents by running them directly into natural streams. Recent legislation and public interest in pollution abatement will make it necessary, if plants continue to use conventional petroleum-based soluble oils, to employ expensive and impractical processes of breaking the emulsions down with acids or salts to remove the oil before depositing the effluents into the streams. Alternatively, the effluents can be economically deposited into santitary sewers. However, it was found that conventional soluble oil emulsions containing petroleum oil and other non-biodegradable substances caused the activated sludge of the sewage disposal plant to be made inactive.

We have now found a novel water-containing fluid composition suitable for use as an aqueous dispersion in various types of industrial processing and metal working applications which novel compositions are in essence completely biodegradable and can be economically disposed of after use by direct transferral to a waste-treatment system. The novel fluid composition of the invention is made from about 2 to 50, preferably about 10 to 40, weight percent of a monocarboxylic acid, about 1 to 50, preferably about 5 to 25, weight percent of a salt-forming base, about 20 to 90, preferably about 20 to 50 weight percent of an alcohol, and about 1 to 77, preferably about 20 to 65 weight percent of water. The exact proportions of each component may vary depending upon the particular machinery operation or industrial process in which the composition is employed. Generally, the amount of the monocarboxylic acid salt should not exceed that which maintains the fluidity of the composition, e.g., often up to about 60% by weight; but in any event the salt is at least about 3 weight percent of the composition. Thus the composition may contain free acid or base. When the base is an alkanol amine it is often used in an amount of at least about 125% of that needed to neutralize the acid and this excess may impart anticorrosive properties to the composition.

The monocarboxylic acid component used in the composition of the present invention is an aliphatic monocarboxylic acid having about 10 to 32 carbon atoms. Suitable aliphatic monocarboxylic acids include saturated fatty acids such as lauric, myristic, palmitic, stearic, behenic, cerotic as well as olefinically-unsaturated fatty acids such as oleic, linoleic, linolenic, recinoleic, etc.

As the base component, capable of forming a salt with the monocarboxylic acid, amines, especially water-soluble amines, such as the alkanolamines, are highly preferred. In general, amines having the following structural formula may be used as the base component in this invention:

$$R_mNH_n$$

wherein R is an alkyl, phenyl or hydroxyalkyl group of 2 to 12, preferably 2 to 4, carbon atoms, $m$ is 1 to 3 and $n$ is 0 to 2, the total of $m$ plus $n$ being 3. Some examples of the amines that may be used in the compositions of the invention include monomethanolamine, monoethanolamine, monobutanolamine, diethanolamine, triethanolamine, methylamine, ethylamine, n-propylamine, n-butylamine, dimethylamine, diethylamine, trimethylamine, phenylamine, benzylamine, etc. Other suitable bases that may be used in the composition of the invention include ammonia and the alkali metal hydroxides such as sodium and potassium hydroxide.

The alcohol component of the composition of the invention may be included, for example, to prevent freezing and is further important when preparing the composition as discussed below. Suitable alcohols, including glycols and glycol ethers, are water-soluble in the amounts used and may often contain 1 to about 25 carbon atoms. Some examples of alcohols that may be used in the composition of the invention include alkanols, such as methanol, ethanol, n-propanol, isopropanol, n-butanol, isobutanol, sec-butanol, tert-butanol, etc.; glycols, such as ethylene glycol, propylene glycol, 1,3-propanediol, 1,2-butanediol, 2,3-butanediol, 1,4-butanediol, pinacol, etc.; polyols, such as glycerol, erythritol, pentaerythritol, ribitol, sorbitol, etc.; alkoxyalcohols, for example, the hydroxy ethers, such as, methoxymethanol, 1-methoxyethanol, 2-methoxyethanol, 1-ethoxyethanol, 2-ethoxyethanol, 2-ethoxypropanol, 2-ethoxybutanol, diethylene glyol, triethylene glycol, etc.; polyether glycols, e.g. polyethylene glycols, of up to about 750 or more molecular weight; and like compounds.

In use as water dispersed lubricants or coolants the compositions of this invention may be dispersed in the desired amount of water, often about 5 to 400 or more parts of water, depending upon the particular application contemplated. The composition of the invention is especially useful for lubricating solid, e.g. metal, surfaces in contact with molten glass by providing a lubricating amount of an aqueous dispersion of the composition between the surface and the glass. For example, in use as a glass working fluid one part of the lubricant composition for approximately each 100 to 400 parts of water, preferably for approximately each 300 parts of water, may be used to obtain satisfactory results.

It may be desirable to add a small amount, say about 0.1 to 5% by weight of other ingredients such as antifoam agents, antiwear additives, biocides, preservatives, antigelling agents, metal deactivators, etc. If such additives be incorporated, it is important that they be biodegradable, especially in a sanitary sewage treating system.

In preparing the composition of the invention, it is highly desirable to combine at least 20 weight percent, based upon the total weight of the composition, of the alcohol component, the monocarboxylic acid and the base prior to the addition of the water, which enables simple stirring of the mixture. A thick phase requiring elaborate and heavy duty mixing apparatus results, it was found, if the water is added directly to the monocarboxylic acid and base components before the alcohol. The alcohol component and preformed monocarboxylic acid salt, containing any excess of either the acid or the base, may be combined by mixing at a temperature of about 65° to 140° F. Alternatively, the fatty acid salt may be prepared in situ at the same temperature range and this is the preferred method.

EXAMPLE

A 10,000–12,000 pound batch of the fluid composition of the invention was prepared by the following procedure. When preparing smaller or larger batches it may be necessary to vary the rates of addition, mixing times, etc., accordingly.

TABLE I

| Blending Sequence | Composition | Wt. percent |
| --- | --- | --- |
| 1 | Ethylene glycol | 30.0 |
| 2 | Monoethanol amine | 10.0 |
| 3 | Metal deactivator | 0.5 |
| 4 | Oleic acid | 20.0 |
| 5 | Water | 1.0 |
| 6 | Antifoam agent | 0.2 |
| 7 | Water | 38.3 |

Step 1: Blend ethylene glycol, monoethanolamine and metal deactivator at 70–80° F.
Step 2: Add oleic acid at the rate of about 10 gallons per minute stirring rapidly and recirculating if possible. Stir for an additional 30 minutes.
Step 3: Disperse antifoam agent separately in 1% water and then blend thoroughly into above mixture.
Step 4: Add water at the rate of 15–20 gallons per minute while stirring rapidly and recirculating, if possible. Stir for an additional 30 minutes.

All of the materials that are added after Step 1 were at a temperature above 65° F. Also the product was homogeneous before the water was added.

The antifoam agent used in the above example was "Antifoam AF" a 30% active silicone defoaming agent applied in an emulsion and well known in the art. It contains dimethylpolysiloxane, silica, stearate emulsifiers, sorbic acid and water. It is dispersible in water, has a specific gravity (60/60° F) of 1.002–1.014 and a silicon content of 11.2 to 11.6%. The metal deactivator employed was benzotriazole.

The fluid composition prepared above was subjected to a biodegradability test, using a simulated activated sludge system. A 14-liter New Brunswick MicroFerm fermentor was used to simulate an activated sludge sewage treatment system. Activated sludge and raw sewage were obtained from a local disposal plant. The synthetic sewage used in all tests were prepared as follows:

Synthetic sewage:[1]
  Bacto peptone—3.5 gm.
  NaCl—3.0 gm.
  $K_2HPO_4$—0.5 gm.
  $MgSO_4 \cdot 7H_2O$—0.2 gm.
  Raw sewage—1 liter
  Deionized water—11 liters Ten liters of synthetic sewage containing between 2000 to 3000 mg./liter (dry weight) activated sludge as recommended for normal sewage plant operation were added to the fermentor. Temperature was held at 25° C. and the air flow controlled at approximately one liter per minute. Slight mixing (100 r.p.m.) was used to keep the sludge in suspension during operation. Retention time in the system was limited to eight hours, the maximum expected in a normal treating operation. At the end of this period, air flow and mixing were discontinued and the sludge allowed to settle. The clear water was siphoned off and fresh synthetic sewage added. Approximately 1.5 liters of sludge remained in the fermentor after the clear effluent was removed. Samples (200 ml.) were collected initially, at four and at eight hours. Chemical and Biochemical Oxygen Demand determinations were made on clear supernate from each sample, employing the procedures outlined in "Standard Methods for the Examination of Water and Wastewater," American Public Health Association, Inc., 1960.

Three such runs were made. The first and third runs were made without the novel fluid composition added in order to obtain information on sludge activity.

Results presented in Table II demonstrate the complete degradation of the fluid composition as indicated by COD and BOD (Chemical and Biochemical Oxygen Demand) determinations. These procedures are routinely used by disposal plant operators to determine the quality of their effluent. Run 1 demonstrates the effectiveness of the system in handling synthetic sewage. The fluid composition added to the system in run 2 only slightly increased the initial COD and BOD. After eight hours exposure the levels had been reduced to that of the first run. Run 3 was made to demonstrate that the fluid composition had no adverse affect on sludge activity.

Only a slight increase in BOD was observed initially when the fluid composition was introduced into the system. This was apparently due to the product adsorbing on the activated sludge. Table III contains results of a test set up to demonstrate this phenomenon. The dry weight of the sludge before and after addition of the fluid composition clearly demonstrates the adsorption. During the eight hour aeration (reaction) period the weight of the sludge gradually returned to the level before the product was added. This plus the fact that the clear effluent at the end of the tests had essentially the same COD and BOD levels as the control (run 1) indicates that complete degradation of the fluid composition had occurred.

[1] Huddleston, R. L. and Allred, R. C.—Evaluation of Detergent Degradation Using Activated Sludge, J. Am. Oil Chemists 41 (11) 732–735, November 1964.

TABLE II.—DISPOSAL OF THE NOVEL FLUID COMPOSITION IN A SIMULATED ACTIVATED SLUDGE SYSTEM

| | Chemical Oxygen Demand (COD), p.p.m.[1] | | | Five Day Biochemical Oxygen Demand (BOD), p.p.m.[2] | | |
|---|---|---|---|---|---|---|
| Exposure Time (Hours) | 0 | 4 | 8 | 0 | 4 | 8 |
| Run number: | | | | | | |
| 1. No fluid composition | 234 | 90 | 39 | 213 | 60 | 50 |
| 2. 2.3 ml. fluid composition | [3]344 | 180 | 86 | [3]276 | 253 | 40 |
| 3. No fluid composition | 266 | 63 | 42 | 210 | 63 | 41 |

[1] Chemical Oxygen Demand is the amount of dichromate oxidizable material in a water or sewage sample. It is reported as mg./liter (p.p.m.) of dichromate oxygen utilized.
[2] Biochemical Oxygen Demand is an estimate of the quantity of oxygen required by bacteria (during a five day incubation period) to oxidize, or render stable, the more easily decomposable organic substances in a water or sewage sample. It is reported as mg./liter (p.p.m.) of oxygen utilized.
[3] These determinations are low due to adsorption of the fluid composition on the activated sludge.

TABLE III

Changes in solids concentration during activated sludge tests with the novel fluid composition added Time of sampling: Mg./liter
Initial— dry weight)[1]
   Before adding the fluid composition ____ [2]1340
   After adding the fluid composition _____ 1590
   4 hours after adding the fluid composition __ 1470
   8 hours after adding the fluid composition __ 1300

Several water-base biodegradable fluid compositions listed in Table IV made by the above procedure were subjected to rust and wear tests. For comparison, a nonbiodegradable soluble oil composition containing petroleum oil which is representative of the fluids now used in industry was subjected to the identical tests. The results are listed in Table V.

TABLE IV

| | Composition | | | | | |
|---|---|---|---|---|---|---|
| Conc., Wt. percent | A | B | C | D | E | F |
| Triethanolamine | 13 | 13 | 15 | 15 | 20 | 20 |
| A mixture of tall oil fatty acids and rosin acids | 20 | | | | | |
| Oleic acid | | 20 | 15 | 15 | 20 | 20 |
| Ethylene glycol | | 30 | 15 | | | |
| Diethylene glycol | | | | 20 | 25 | 15 |
| Polyethylene glycol of approx. 600 molecular weight | | | 15 | | | 10 |
| Water | 67 | 36.8 | 40 | 50 | 35 | 35 |
| Antifoam Agent of example | | 0.2 | | | | |

TABLE V

| | Shell four ball wear test, scar diameter, mm.[1] | | Modified ASTM 665 test[2] | | Cast iron chip rust test[3] | | |
|---|---|---|---|---|---|---|---|
| Dilution | 1:150 | 1:300 | 1:150 | 1:300 | 1:100 | 1:200 | 1:300 |
| Non-biodegradable soluble oil | 0.63 | 0.70 | No Rust | No Rust | Heavy Rust | Heavy Rust | Very Heavy Rust. |
| Composition A | 0.63 | 0.65 | do | do | No Rust | Light Rust | Light Rust. |
| Composition B | 0.53 | 0.50 | do | do | do | do | Do. |
| Composition C | 0.53 | 0.73 | do | Very Light Rust | do | do | Moderate Rust. |
| Composition D | 0.50 | 0.80 | do | do | Trace Rust | do | Heavy Rust. |
| Composition E | 0.50 | 0.50 | do | No Rust | do | Moderate Rust | Do. |
| Composition F | 0.50 | 0.52 | do | do | do | do | Do. |

[1] Test conditions: 1,800 r.p.m., 5 kg., 1 hour, at 130° F.
[2] Test conditions: A mild steel test rod was immersed for 24 hours at 140° F. in a beaker in ASTM 665 test apparatus with no stirring.
[3] This method is a standard test often used for testing rust inhibiting properties of soluble oil emulsions. It consists of immersing cast iron chips in test emulsion in a beaker, covering with a watch glass, inverting and allowing emulsion to drain while chips remain on watch glass covered with glass beaker. Chips are observed for rust after 24 hours.

The data in Table V show that our novel water-containing biodegradable fluids are at least comparable to, if not better than, the petroleum oil-based soluble oil in reducing wear and preventing rust.

Table VI lists two biodegradable fluids to which have been added a small amount of benzotriazole. These two fluid compositions, along wtih other fluid compositions listed in Table VI, which contained no benzotriazole, were each tested for copper corrosion prevention by placing a copper strip, one-half exposed, into a bottle containing the fluid composition to be tested. A visual determination is made of the extent of corrosion. Additionally, the same fluid compositions were given the Shell 4-Ball Wear Test. All the fluids tested were made by the above procedure. The results are listed in Table VII.

TABLE VI

| | Composition, weight percent | | | |
|---|---|---|---|---|
| | G | H | I | J |
| Ethylene Glycol | 30 | 30 | 30 | 30 |
| Triethanolamine | 13 | | | |
| Diethanolamine | | | | 13 |
| Monoethanolamine | | 10 | 10 | |
| Oleic Acid | 20 | 20 | 20 | 20 |
| Water | 36.3 | 39.8 | 39.3 | 36.8 |
| Antifoam Agent of Example | 0.2 | 0.2 | 0.2 | 0.2 |
| Benzotriazole | 0.5 | | 0.5 | |

TABLE VII.—COPPER CORROSION AT 150° F. AFTER 96 HRS. AT 1:150 DILUTION

| Composition: | Corrosion |
|---|---|
| J | Heavy. |
| H | Moderate. |
| G | None. |
| I | Do. |

| | Shell 4 Ball Wear Test, 1 hr., 5 kg., 1,800 r.p.m. at 130° F., Width Scar, min. | |
|---|---|---|
| Dilution | 1:150 | 1:300 |
| Composition J | .667 | .683 |
| Composition H | .480 | .680 |
| Composition G | .487 | .496 |
| Composition I | .400 | .436 |

The data in Table VII demonstrate not only that the addition of benzotriazole is effective in preventing copper corrosion, but in fact, it enhances the wear-reduction properties of the fluid composition.

Three preservatives were added to Composition B, and the resulting mixtures were tested to determine the effect of the additives on the wear reduction and rust-inhibiting properties of the composition. The data in Table VIII discloses that the addition of the three preservatives has no adverse effect on the wear reduction and rust inhibition properties of the fluid composition. While the preservatives are effective at normal use concentrations, dilution of the used formulation in sewage pre-

[1] Average of three determinations.
[2] The activated sludge concentration in this test was lower than that normally used.

vents them from interfering with biodegradation in the treatment plant.

TABLE VIII.—SHELL BALL WEAR TESTS AND CAST IRON CHIP RUST TESTS OF NOVEL FLUID COMPOSITION

| Preservative (1,000 p.p.m.) | Shell Four Ball Wear Test, Scar Diameter, mm.[1] | Cast Iron Chip Rust Test |
|---|---|---|
| Composition B+Preservative A [2] | 0.48 | Light. |
| Composition B+Preservative B [3] | 0.47 | OK. |
| Composition B+Preservative C [4] | 0.507 | OK. |

[1] Test conditions: 1,800 r.p.m., 5 kg., 1 hour, at 130° F.
[2] 1-(3 chloro-allyl)-3,5,7-triazo-1-azoniadamantane chloride.
[3] 2-nitro-1-butanol.
[4] Nalco ID-10164 (proprietary compound of Nalco Chemical It is claimed:

1. A method of lubricating a solid surface in contact with molten glass which comprises providing, between said surface and said glass, an aqueous dispersion of a composition consisting essentially of about 2 to 50 weight percent of an aliphatic monocarboxylic acid having about 10 to 32 carbon atoms, about 1 to 50 weight percent of a water-soluble alkanol amine containing about 2 to 12 carbon atoms, said acid and amine serving to provide at least about 3 weight percent of their salt, about 20 to 90 weight percent of a water-soluble alcohol, and about 1 to 77 weight percent of water.

2. A method of lubricating a solid surface in contact with molten glass which comprises providing, between said surface and said glass, an aqueous dispersion of a composition consisting essentially of about 10 to 40 weight percent of an aliphatic monocarboxylic acid having about 10 to 32 carbon atoms, about 5 to 25 weight percent of a water-soluble alkanol amine containing about 2 to 12 carbon atoms, about 20 to 50 weight percent of a water-soluble alcohol and about 20 to 65 weight percent of water.

3. The method of claim 1 wherein the base is an ethanol amine.

4. The method of claim 2 wherein the alcohol is ethylene glycol.

5. The method of claim 3 wherein the acid is oleic acid.

6. The method of claim 5 wherein about 0.1 to 5 weight percent of benzotriazole is added to the composition.

References Cited

UNITED STATES PATENTS

| | | | |
|---|---|---|---|
| 2,784,108 | 3/1957 | Cupper | 117—5.3 |
| 2,849,107 | 8/1958 | Logue | 252—49.3 X |
| 2,966,425 | 12/1960 | Fucinari et al. | 252—34 X |
| 3,265,620 | 8/1966 | Heiman | 252—49.3 X |
| 3,304,258 | 2/1967 | White et al. | 252—49.3 X |
| 3,311,557 | 3/1967 | Schiermieer | 252—49.3 X |
| 3,336,225 | 8/1967 | Sayad et al. | 252—49.3 X |
| 3,374,171 | 3/1968 | Davis | 252—49.3 X |

OTHER REFERENCES

Perlman: Soap and Chemical Specialties, September 1963, "Detergent Biodegradability."

DANIEL E. WYMAN, Primary Examiner

W. H. CANNON, Assistant Examiner

U.S. Cl. X.R.

65—26; 117—5.3; 252—34, 49.3, 42.1, 89